Jan. 19, 1943.     H. D. MELLON     2,308,990
LATHE TOOL HOLDER
Filed July 7, 1941

Inventor
Herbert D. Mellon
By Frease and Bishop
Attorneys

Patented Jan. 19, 1943

2,308,990

UNITED STATES PATENT OFFICE 2,308,990

LATHE TOOLHOLDER

Herbert D. Mellon, Canton, Ohio

Application July 7, 1941, Serial No. 401,352

3 Claims. (Cl. 77—60)

The invention relates generally to lathe tool holders and more particularly to an improved holder for tapered shank twist drills and reamers and like tools used in a lathe.

In drilling a piece of work in a lathe, the work is held in a chuck on the headstock and rotated, while the drill is non-rotatively held in the tailstock and fed toward the work. In order to hold the drill in the tailstock, the tapered shank of the drill is sometimes tightly fitted directly into the tapered socket of the tailstock spindle, and the drill is held from turning by the friction between the drill shank and the socket. However, the turning action of the work on the drill often causes some turning of the drill shank in the spindle socket and a slight amount of such turning will score the spindle socket and ruin it for further work.

Moreover, with the drill shank fitted directly in the socket of the tailstock spindle, there is no way to get the "feel" of the drilling action, and consequently the drill is apt to be fed in too rapidly and broken.

Prior tool holder constructions have included a cylindrical body with a handle extending radially therefrom, the body having at one end a tapered bore to fit the tapered shanks of standard drills and reamers, and having at its other end a conical depression to receive the center point of the tailstock center. Such a tool allows the operator to get the feel of the drilling action and eliminates scoring the tailstock spindle socket, but is dangerous to use for several reasons.

For example, when the drill breaks through the inside end of the work piece, it has a tendency to pull away from the tailstock due to lack of resistance and the spiral of the drill flutes, and accordingly the conical depression of the holder pulls away from the tailstock center piece so that the drill and holder has no support other than the engagement of the drill with the work.

Also, it frequently happens that during the drilling operation, the operator accidentally unintentionally backs off the tailstock a small amount, and because of the short bearing between the tailstock center and the tool holder the slightest back movement of the tailstock removes the support from the tool holder.

In either event, the sudden load of the holder on the outer end of the drill when engaged with the rotating work piece is bound to cause damage to the work or drill or to the lathe itself, and serious injury to the operator may result, especially since the natural tendency of the operator is to grasp and try to hold the drill or holder with his hands.

It is therefore a general object of the present invention to provide a novel and improved tool holder for a lathe which renders a drilling or reaming operation entirely safe and prevents damage to the tool and lathe.

Another and more specific object is to provide a novel and improved tool holder which will support a drill or the like in a lathe, regardless of the drill breaking through the work piece.

Another object is to provide a novel and improved tool holder which will always support a drill or the like in a lathe, even though the tailstock is backed off during the drilling operation.

A further object is to provide a novel and improved tool holder which is safe and convenient for the most inexperienced operator to use, and which is simple and inexpensive to construct.

These and other objects are accomplished by the parts, improvements, structures and combinations comprising the present invention, which is shown in the accompanying drawing and hereinafter described and claimed.

In general terms the invention may be briefly described as including a tool holder having a tapered socket for receiving the drill shank, and a tapered swivel member for fitting the socket of the tailstock spindle.

Referring to the drawing in which a preferred embodiment of the invention is shown by way of example, Figure 1 is a fragmentary plan view of an ordinary lathe, showing the improved tool holder mounting a drill therein;

Similar numerals refer to similar parts throughout the several views of the drawing.

Figure 1:
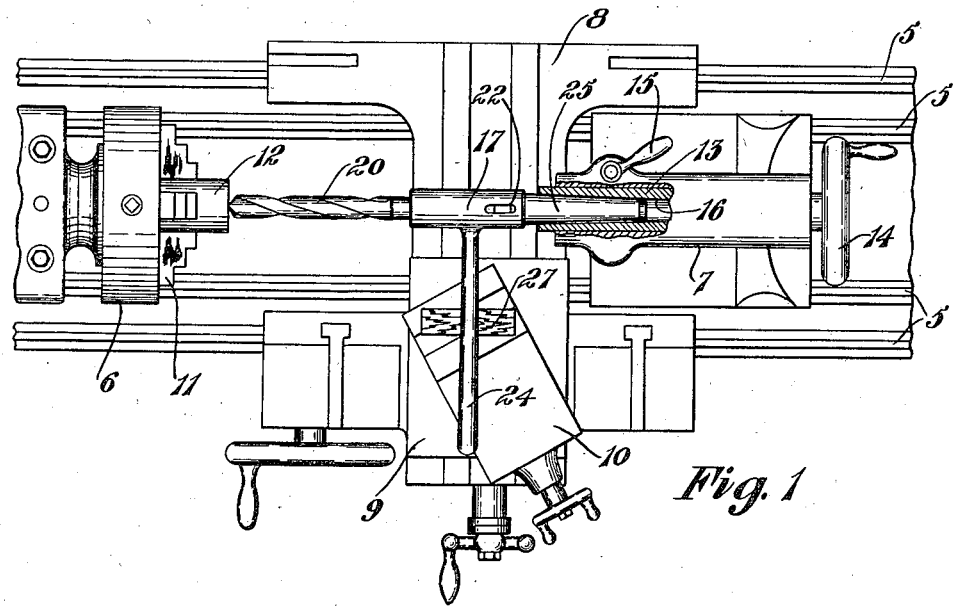

In Fig. 1 a part of an ordinary lathe is shown in plan elevation somewhat diagrammatically. The lathe includes ways 5, a headstock 6, tailstock 7 and a carriage 8. The carriage has a cross slide 9 thereon and a tool rest 10 is mounted thereon in a usual manner.

An ordinary lathe chuck 11 is shown mounted in the headstock 6 and a piece of work 12 is secured in the chuck. The tailstock is provided with the usual tailstock spindle 13 which is operated by the hand wheel 14, and which is locked in desired position by the locking lever 15. The tailstock spindle 13 is provided with a tapered bore or socket indicated at 16.

The parts of the lathe thus far described are conventional and well known, and form no part of the present invention.

The improved tool holder preferably includes a cylindrical body 17 which has a tapered longitudinal bore 18 opening from one end and a longitudinal spindle 19 projecting from the other end. The tapered bore 18 is adapted to fit tightly the tapered shanks of standard drills, reamers and the like, and one such drill is indicated at 20 with its tapered shank 21 fitted into the bore 18.

Figure 2:
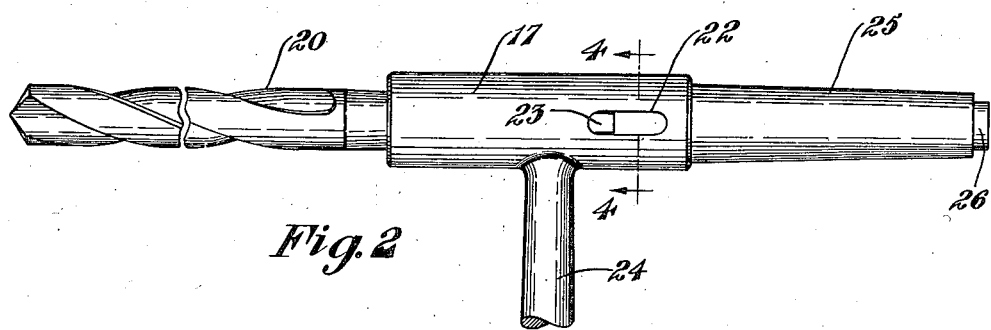
Fig. 2 is a detached elevation of the improved tool holder with a drill positioned therein, parts being broken away.
Figure 3:
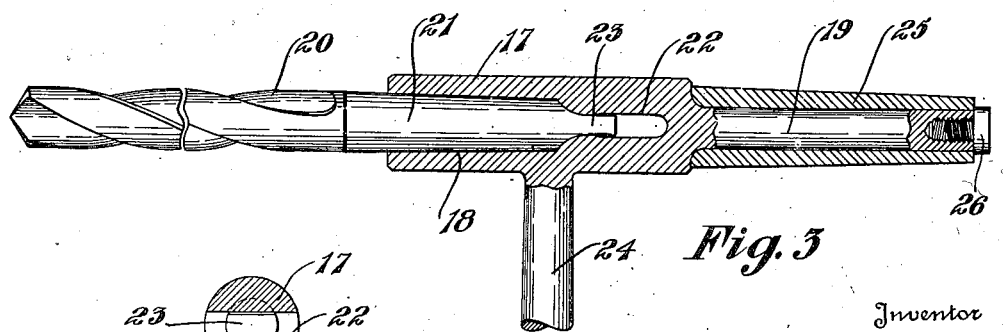
Fig. 3 is a similar view with parts in section.
Figure 4:
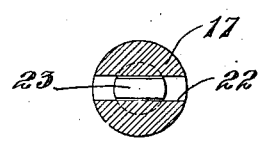
Fig. 4 is a transverse sectional view as on line 4—4, Fig. 2.

The body 17 of the tool holder is provided with a transverse slot 22 extending through the holder and communicating at one side with the inner end of the tapered bore 18, and the flattened end 23 provided on the shanks of standard taper shank tools is adapted to extend into the transverse slot 22 as shown in Figs. 2 and 3, to prevent the drill from turning in the tool holder. When it is desired to remove the drill from the holder, an ordinary drift pin is driven into the slot 22 to loosen the drill.

The body 17 of the tool holder is provided with a handle 24 extending at right angles thereto or radially therefrom to facilitate handling the tool holder and to prevent it from turning with the drill during the drilling operation. The spindle 19 has swiveled thereon a sleeve 25 which has a tapered exterior surface adapted to fit snugly into the tapered bore or socket 16 of the tailstock spindle. A screw 26 is screwed into the end of the spindle 19 for holding the sleeve 25 on the spindle while permitting it to rotate on the spindle.

In the operation of the improved tool holder, if it is desired to drill a hole in the work piece 12, a center is first spotted on the work piece in a customary manner. The desired drill 20 is then selected and its shank 21 positioned in the socket 18 of the handle, with the flattened end 23 of the shank entered into the slot 22. The holder and the drill are then positioned as shown in Fig. 1, with the tapered sleeve 25 fitted tightly in the tapered socket 16 of the tailstock spindle. The handle 24 of the holder is rotated so as to rest upon the tool rest 10, and preferably upon a block of wood 27 positioned on the tool rest as shown in Fig. 1. By using a block under the handle 24 a space under the end of the handle 24 is provided in order to make it easier for the operator to grasp the handle.

The work piece 12 is now rotated by rotating the headstock 6 and the drill is fed toward the work piece gradually by manipulation of the handle wheel 14 to drill a hole through the work piece. During the drilling operation the holder is held against rotation by the abutment between the handle 24 and the block 27, and the operator can at any time grasp the handle to get the feel of the drilling action so as not to feed the drill into the work too rapidly.

The swiveled sleeve 25 provides a bearing supporting the tool holder so that even though the drill tends to pull away from the tailstock when it breaks through the inside end of the work piece, or if the operator unintentionally backs off the tailstock during the drilling operation, there is no danger of the holder dropping down and imposing a sudden load on the shank end of the drill. Moreover, the swivel sleeve 25 provides a support for the drill and holder without any possibility of scoring the socket in the tailstock spindle, because the spindle 19 of the holder is swiveled in the tapered sleeve.

Thus a drilling operation in a lathe can be performed by an unskilled operator without any danger of damage to the lathe or tool or holder, and without any danger of personal injury.

The improved tool holder is simple and compact in construction and extremely easy to use.

I claim:

1. A tool holder for a lathe having a body provided with a radially projecting handle, said body being provided at one end with a tapered socket for fitting the tapered shank of a drill and the like, and a tapered supporting member swiveled on the other end of said body and adapted for fitting in the tapered socket of the tailstock spindle of the lathe.

2. A tool holder for a lathe having a body provided with a radially projecting handle, said body being provided at one end with a tapered socket for fitting the tapered shank of a drill and the like, said body having a transverse slot communicating with the inner end of said socket in which slot the flattened end of the drill shank is adapted to be engaged, a spindle on the other end of said body, an exteriorly tapered sleeve swiveled on said spindle and adapted for fitting into the tapered socket of the tailstock spindle of the lathe, and a screw secured in the end of the spindle for holding said sleeve on said spindle while permitting the sleeve to rotate.

3. A tool holder for a lathe having a body provided with a radially projecting handle, said body being provided at one end with a tapered socket for fitting the tapered shank of a drill and the like, said body having a transverse slot communicating with the inner end of said socket in which slot the flattened end of the drill shank is adapted to be engaged, and a tapered supporting member swiveled on the other end of said body and adapted for fitting in the tapered socket of the tailstock spindle of the lathe.

HERBERT D. MELLON.